United States Patent
Wu

(10) Patent No.: US 6,222,727 B1
(45) Date of Patent: Apr. 24, 2001

(54) PORTABLE HARD DISK DRIVE REMOVABLE HOUSING STRUCTURE

(76) Inventor: Wen-Kao Wu, P.O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/474,266

(22) Filed: Dec. 29, 1999

(51) Int. Cl.$^7$ ........................................................ G06F 1/16
(52) U.S. Cl. ........................ 361/685; 361/727; 360/97.07; 312/332.1
(58) Field of Search ........................... 361/685, 725–727; 360/97.01, 98.01, 137, 137 D; 312/332.1, 333; 248/500

(56) References Cited

U.S. PATENT DOCUMENTS

| | | | |
|---|---|---|---|
| 5,911,589 | * 6/1999 | Chen | 439/296 |
| 5,959,834 | * 9/1999 | Chang | 361/685 |
| 6,094,342 | * 6/2000 | Dague et al. | 361/685 |
| 6,137,679 | * 10/2000 | Chang | 361/686 |

\* cited by examiner

*Primary Examiner*—Leo P. Picard
*Assistant Examiner*—Hung Van Duong

(57) ABSTRACT

An improved structure portable hard disk drive removable housing that provides for a modular housing and frame assembly, energy savings and convenience, an upper cover and a lower cover, cooling fan installation and ergonomic design, easy assembly and disassembly and, furthermore, does not require an access key, has as adjustment knob-equipped handle to prevent damage from excessive pulling, will not fail to open due to lost components, and allows for the rapid and simple positioning of the hard disk drive. The present invention offers an upper and a lower cover having tabs on two sides that are inserted into the mounting slots on the two sides of the housing. A front cover serving as an enclosure is formed at the front of the housing to provide for installation of cooling fans that are mounted with screws. An adjustment knob having a straight rod is situated at one side of the front cover that provides for placing the handle into a flush position by means of a 7-shaped detent block, with advancing edges and projections at the end sections and forward side that function when the handle is pressed down or lifted up to separate or conjoin a plug and socket inside at the rear extent of the frame as well as a correction bar situated in the housing that provides for the accurate positioning and mounting of the hard disk drive. As such, the present invention has enhanced performance and increased practical product value.

1 Claim, 5 Drawing Sheets

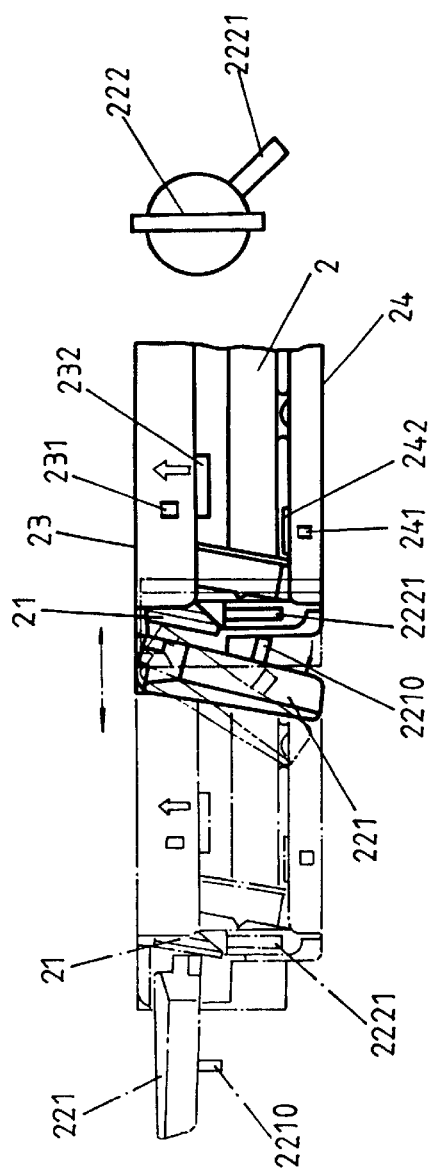
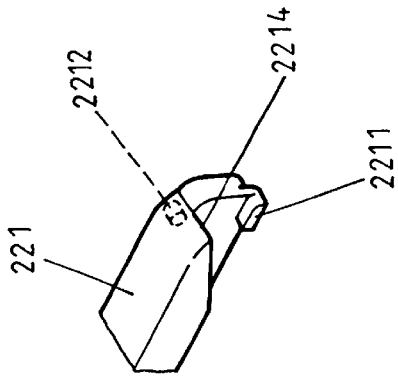
FIG.6
FIG.7
FIG.8

PORTABLE HARD DISK DRIVE REMOVABLE HOUSING STRUCTURE

BACKGROUND OF THE INVENTION

1) Field of the Invention

The invention herein relates to an improved structure portable hard disk drive removable housing comprised of an upper and a lower cover having tabs that are inserted into the mounting slots at the two sides of a housing. A front cover at the forward aspect of the housing serves as an enclosure that provides for the screw mounting of cooling fans and situated at one side of the front cover is an adjustment knob having a straight rod that provides for the flush positioning and release of a handle, and there are advancing edges and projections laterally situated at the front end of the handle such that when it is pressed down or lifted up, the plug and the socket of the housing and frame are conjoined or separated and, furthermore, there is a correction bar situated in the housing that enables the rapid positioning and mounting of the hard disk drive.

2) Description of the Prior Art

Conventional removable hard disk drive housings have an upper and lower cover on an internal frame for containing the hard disk drive, with screws inserted to secure the upper and lower cover. Such structures are not only very inconvenient to assemble and disassemble in that they are time- and labor-intensive as well as ncompatible with ergonomic design, but also require special tools for assembly and disassembly, making them quite impractical and costly to produce. The heat dissipating fans of conventional products are typically mounted at the rear and, furthermore, with present hard disk drives operating at approximately 10,000 rpm rather than 4,000 rpm to 5,000 rpm in the past, are incapable of meeting rapid heat dissipation requirements. Furthermore, to install the cooling fans, the conventional product must be completely disassembled, which is highly inconvenient and impractical. A lock is utilized to mount the handle to the frame and thereby prevent damage from pulling, and such locks require a key for opening and since keys that are carried around are easily lost, the result is an inability to open the unit. Furthermore, the production cost is high and such products are impractical because the user must effect release by tugging the handle, which is also prone to unintentional displacement and withdrawal that damages or destroys the hard disk drive. The structure of the conventional handle is not controllable like the handle of the invention herein and there is no way to discern whether the conventional handle is locked down or not fully locked up, removal is easily forced which damages the hard disk drive and, furthermore, the separation and conjoinment operation is dependent on manual strength exerted to push or pull the hard disk drive in or out of the housing, a time and labor consuming procedure that readily damages the hard disk drive or the data stored on the hard disk drive. Furthermore, the internal mounting of the hard disk drive sides to the housing in the conventional product is totally dependent on visual approximation without a consistent means of accurate positioning such that the hard disk drive is often mounted too far forward or backward, preventing the positive insertion of the socket and plug at the rear, with the positional discrepancy requiring time- and labor-consuming disassembly and re-assembly to rectify. Since these shortcomings have always afflicted and troubled manufacturers and consumers, an improved structure portable hard disk drive removable housing structure is required that provides enhanced performance and increased practical value, and this is the motivation behind the invention herein.

SUMMARY OF THE INVENTION

The primary objective of the invention herein is to provide an improved structure portable hard disk drive removable housing, wherein the housing and the frame assembly are separable, energy-saving and convenient, have an upper and a lower cover, accommodates cooling fan installation, is of ergonomic design, allows easy assembly and disassembly, does not require a key and prevents handle damage from excessive pulling, has a low production cost, and will not become unopenable due to component loss.

To enable a further understanding of the technological content, innovations, and functions of the invention herein, the brief description of the drawings below are followed by the detailed description of the preferred embodiments.

BRIEF DESCRIPTION OF THE DRAWINGS

FIG. 6 is an orthographic drawing of the adjustment knob and handle in the opened state.

FIG. 7 is an orthographic drawing of the top and bottom cover assembled to the housing.

FIG. 8 is as isometric and partially magnified drawing of the handle of the invention herein.

DETAILED DESCRIPTION OF THE PREFERRED EMBODIMENTS

Figure 1:
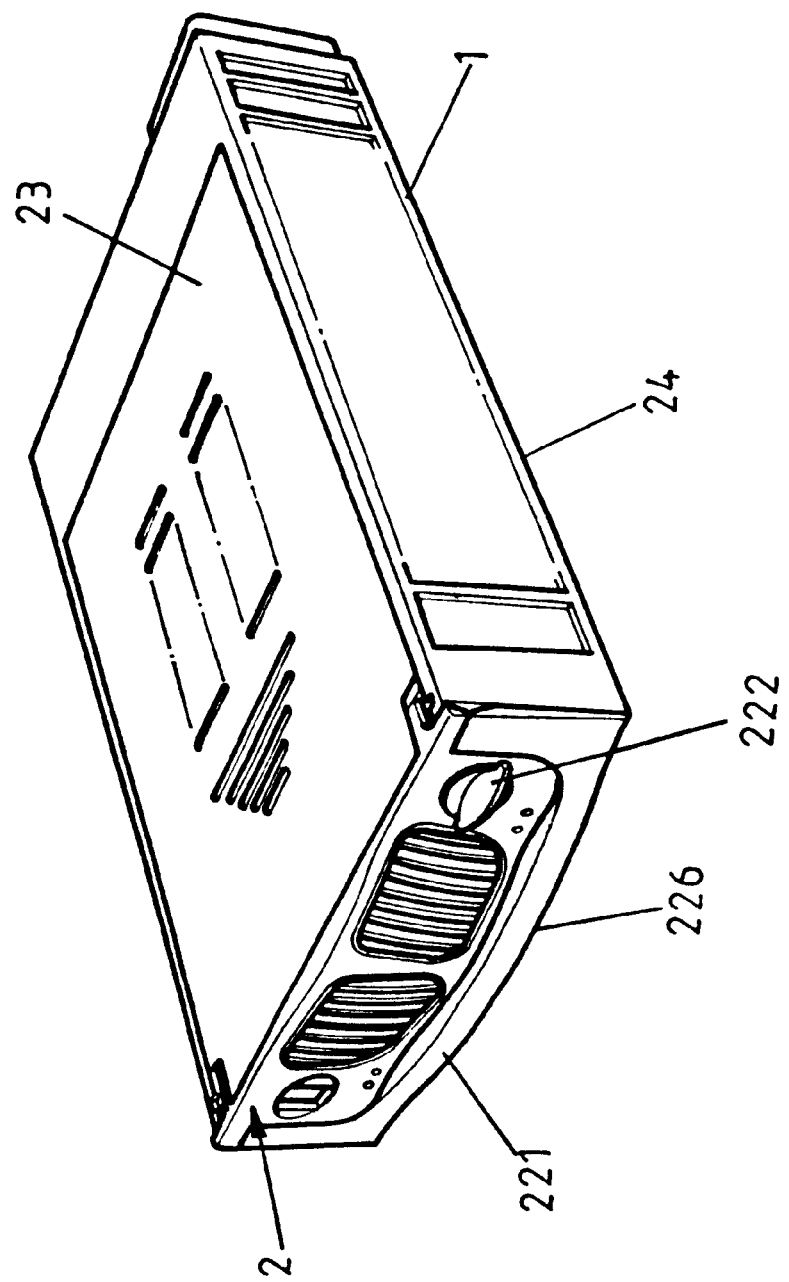
FIG. 1 is an isometric drawing of the invention herein.
Figure 2:
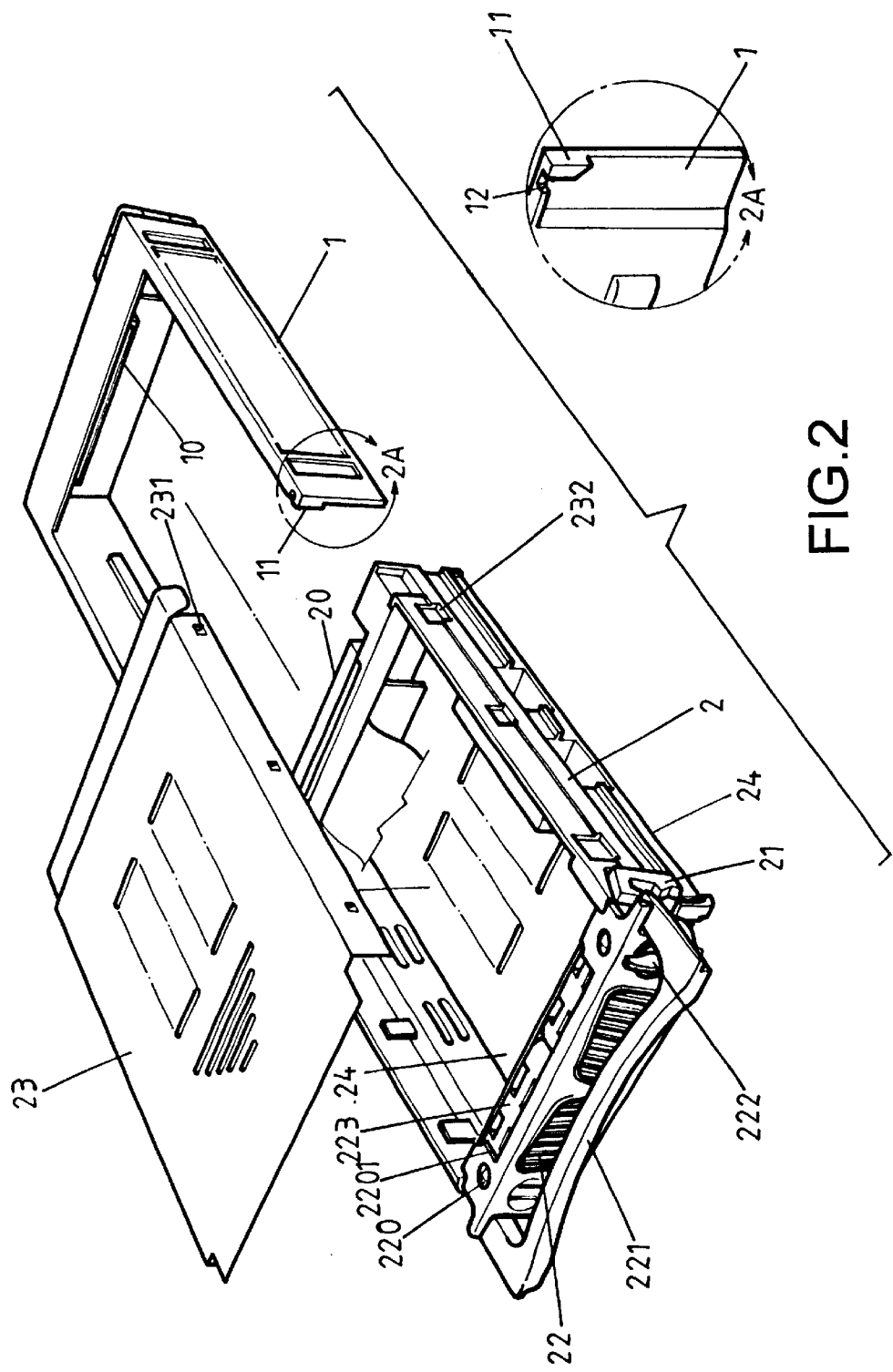
FIG. 2 is an exploded and partially magnified drawing of the invention herein.

Referring to FIG. 1 and FIG. 2, the isometric and exploded and partially magnified drawings of the invention herein, the present invention is comprised of a hard disk drive housing 2 composed of an upper and a lower cover 23 and 24 having tabs 231 and 241 on their two sides that are inserted into the mounting slots 232 and 242 to provide for the rapid and convenient assembly to the housing 2 in the shortest possible time; to disassemble, referring to FIG. 7, the exploded drawing of the upper and lower cover 23 and 24 and housing 2 of the invention herein, a keylock mechanism is rotated to release the tabs 231 and 241 from the mounting slots 232 and 242 and, therefore, the disassembly operation is simple and, furthermore, saves time; to assemble, it is only necessary to press the upper and lower cover 23 and 24 directly against the housing 2 to achieve insertion into the mounting slots 232 and 242; therefore, the invention herein is of an ergonomic design and is a total improvement over the conventional product structure.

Figure 3:
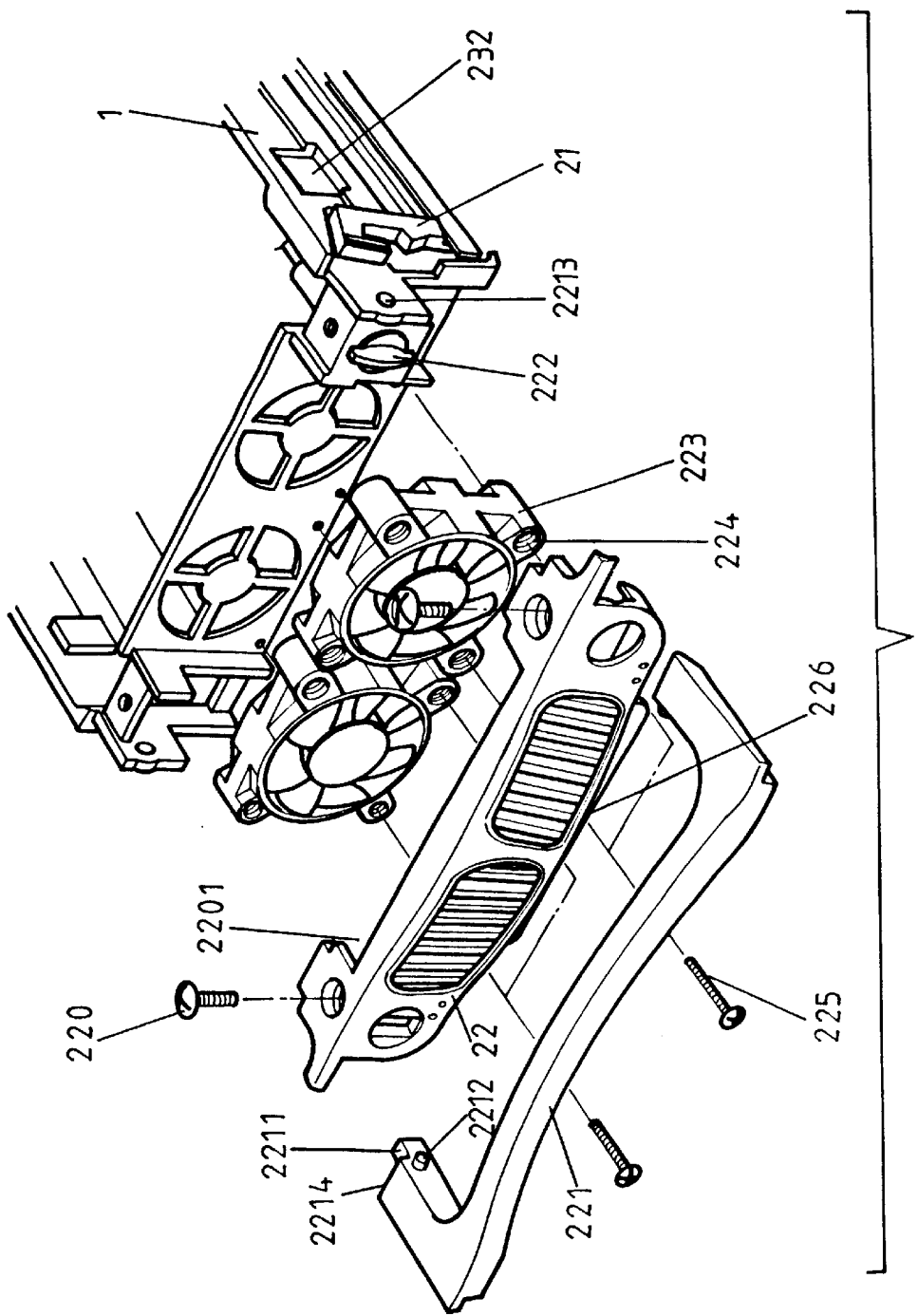
FIG. 3 is an exploded drawing of the handle, the front cover, the cooling fans, and the housing of the invention herein.

The anterior aspect of the housing 2 provides for powerful heat dissipation without requiring disassembly in that cooling fans 223 can be installed on the removable front cover 22 and, referring to FIG. 3, the structure consists of screws 220 that fasten the front cover 22 to the forward extent of the housing 2 and, furthermore, the cooling fans 223 are fastened to the front cover 22 by means of screws inserted into the through-holes 226 at its lower extent, and then into the screw holes 224 similarly disposed at the lower extent such that the cooling fans 223 are mounted against the front panel of the housing 2, a procedure that is rapid and convenient because complete disassembly is not required; the cooling fans 223 can be rapidly dismounted and mounted to the front of the housing 2 and their heat dissipation rate prevents thermal damage to the removable housing 2, which saves time and energy, while also lowering production costs.

Figure 4:
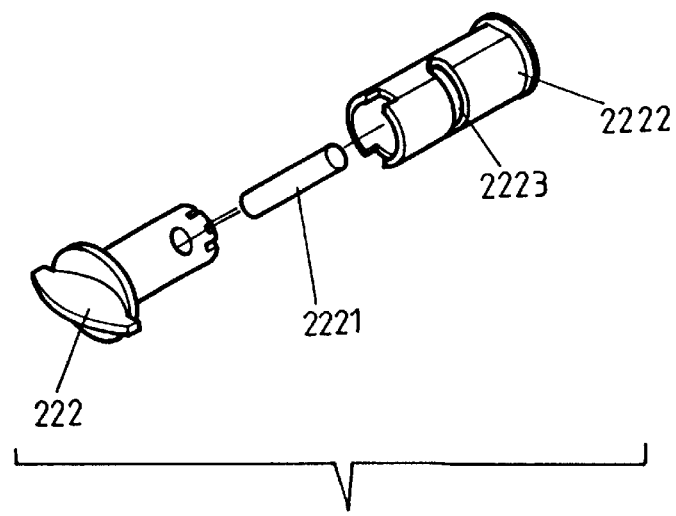
FIG. 4 is an exploded drawing of the adjustment knob of the invention herein.
Figure 5:
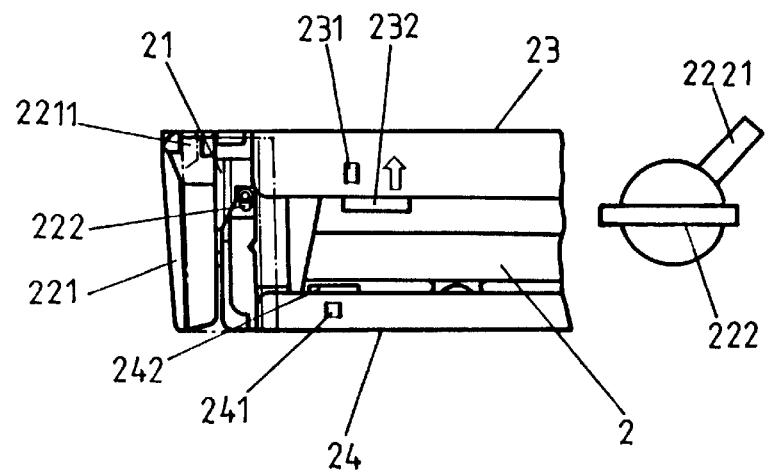
FIG. 5 is an orthographic drawing of the adjustment knob and handle in the closed state.

To provide for housing 2 and frame 1 status discrimination by the user and thereby prevent damage resulting from excessive pulling on the handle 221, there is an adjustment knob 222 laterally positioned on the front cover 22, and the handle 221 has a protruding shaft 2212 situated at each of its two inner sides that are inserted into the through-holes 2213 at each of the two outer sides of the housing 2 such that the handle 2 can be pressed down into a flush position and lifted into a horizontal position to conjoin or separate the plug 20 at the rear extent of the housing 2 to or from the socket 10 at the rear extent of the U-shaped frame 1; there is a projecting element 2211 extending outward from the end of the handle 221 and, furthermore, an advancing edge 2214 that pushes against the side of the U-shaped frame 1, at the lower extent and inner side of which is an impelling spring post 2210 and, as indicated in FIG. 6 and FIG. 8, the projecting element 2211 operates in conjunction with an arrangement at the front end of the frame 1 consisting of a protruding edge 11 having a slot 12 immediately behind, such that when the handle 221 is shoved horizontally in the frame 1, the projecting element 2211 is engaged against the forward end of the protruding edge 11 inside, with the force of the handle 221 against housing 2 causing the plug 20 at the rear extent of the housing 20 to become inserted into the socket 10 inside at the center of the frame 1, while the projecting element 2211 on the handle 221 enters the slot 12 in the U-shaped frame 1; when the handle 221 is pulled horizontally, the projecting element 2211 disengages from the protruding edge 11 and is withdrawn from the slot 12 immediately behind, at which time the advancing edge 2214 situated at the end of the handle 221 pushes against the end of the U-shaped frame 1, shifting the housing 2 forward and the frame 1 backward, causing the plug 20 of the housing 2 to separate from socket 10 of the frame 1, all in a procedure that is both energy- and labor-saving. To prevent the user from applying an excessive drawing force that could be damaging due to a lack of status discrimination when the handle 221 is pressed down into a flush position, there is an adjustment knob 222 on the front cover 22, referring to FIG. 4, that has a straight rod 2221 situated at the perpendicular section and an ensleeved outer shell 2222 having a mounting groove 2233; as indicated in FIG. 5 and FIG. 6, since there is a 7-shaped detent block 21 formed at the front outer end of the housing 2, when the adjustment knob 222 is rotated upward and downward, the said straight rod 2221 engages into the 7-shaped detent block 21 and brings the upper end forward, with the handle 221 pressed into a flush position against the front cover 22. (The spring post 2210 at the lower extent of the handle 221 is compressed inward at this time.)

When the handle 221 is lifted open, the adjustment knob 222 straight rod 2221 rotates and disengages from the 7-shaped detent block 21, and as indicated in FIG. 6, the spring post 2210 is pushed back from the 7-shaped detent block 21, and the handle 2210 is brought into an angled disposition by the spring post 2210 (as shown in FIG. 6) which enables the user to immediately discern the unlocked status, at which time the user can conveniently lift the handle 221 to the horizontal position so that the advancing edge 2214 at the side of the projecting element 2211 is disengaged from the front end of the frame 1, bringing the housing 2 forward and the frame 1 backward, and causing the plug 20 of the housing 2 to separate from socket 10 of the frame 1 and, therefore, the invention herein saves energy and labor and is practical and, furthermore, the adjustment knob 222 is of a simplified structure that is involves low production costs, does not require an access key and thereby precludes the troublesome situation of the user being unable to open the unit due to a misplaced key.

Furthermore, there is a correction bar 25 situated behind the inset 2201 in the the housing 2, wherein since a hard disk drive 26 adjustment screw 251 is horizontally disposed through the center of the correction bar 25 and a fixing screw 252 is fastened perpendicularly against the adjustment screw 251 to maintain its placement, after the correction bar 25 is set thereby to the precise arrangement and the hard disk drive 26 is inserted forward from the rear, the hard disk drive 26 is accurately positioned within the housing 2 in a procedure that is convenient and simple and, at the same time, the two screw fasteners at the sides do not have to be visually referenced in order to properly position and insert the plug 20 at the rear into the socket 10 of the frame.1, which prevents the situation of the conventional product wherein the hard disk drive position is overly biased to the front or rear, resulting in poor contact or an inability to assemble the housing 2 to the frame 1.

In summation of the foregoing section, since the invention herein completely eliminates the shortcomings of the conventional product, features enhanced performance, and has increased product utilitarian value and, furthermore, has never been publicly disclosed or utilized prior to new patent application and is not easily completed by individuals familiar with associated technology, the present invention meet new patent requirements and is hereby submitted in application for review and the granting of the commensurate patent rights.

What is claimed is:

1. An improved structure portable hard disk drive removable housing that provides an upper and a lower cover and fans in an ergonomic design, is easily assembled and disassembled, does not require an access key, has as adjustment knob-equipped handle to prevent excessive pulling, involves low production cost, will not fail to open due to lost components, and allows for the rapid and simple positioning of the hard disk drive, which is comprised of a U-shaped frame having a socket inside and the said frame is assembled to a housing that provides for the containment of a hard disk drive and which has a plug inside at the center that is inserted into the said socket; the said housing has through-holes in each the two sides into which are inserted the protruding shafts formed on the inner sides of a handle, with the said handle having an impelling spring post at the lower extent and inner side, and at the front surface of the said housing is a 7-shaped detent block that positions the said handle into a flush or released state, of which the innovations are:

there are protruding edges situated at the upper two sides of the said frame with slots immediately behind them, and formed on the front end of the said handle are projecting elements, the front ends of which push against the sides of said protruding edges and said slots on the outer sides of the said frame; the said housing is composed of an upper and a lower cover having tabs on their two sides that are inserted into the mounting slots of the said housing to achieve a fastened assembly; there is a front cover situated at the front extent of the said housing for the mounting and enclosure of cooling fans, and there are through-holes in the said front cover providing for the passage of screws that mount the said cooling fans to the front panel of the said housing; there is an adjustment knob situated on one side of the said front cover providing for the positioning of the said handle into a flush or released state that has a straight rod situated at the perpendicular section and an ensleeved outer shell having a mounting groove, the rotation of which shifts it into an angled 7-shaped detent block and moves it forward for engagement or rearward for separation; and there is a correction bar having an adjustment screw and a fixing screw situated behind the inset of the said housing that provides for the accurate positioning of the hard drive during installation.

* * * * *